United States Patent
Paul et al.

(10) Patent No.: US 10,425,452 B2
(45) Date of Patent: Sep. 24, 2019

(54) IDENTIFYING CHANGES IN MULTIPLE RESOURCES RELATED TO A PROBLEM

(71) Applicant: International Business Machines Corporation, Armonk, NY (US)

(72) Inventors: Chakkalamattam J. Paul, Austin, TX (US); Robert T. Uthe, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 14/865,103

(22) Filed: Sep. 25, 2015

(65) Prior Publication Data

US 2017/0093644 A1  Mar. 30, 2017

(51) Int. Cl.
| | |
|---|---|
| H04L 12/24 | (2006.01) |
| H04L 29/06 | (2006.01) |
| H04L 12/18 | (2006.01) |
| H04L 12/58 | (2006.01) |

(52) U.S. Cl.
CPC ............ H04L 65/403 (2013.01); H04L 12/18 (2013.01); H04L 12/1822 (2013.01); H04L 41/0853 (2013.01); H04L 41/0856 (2013.01); H04L 41/00 (2013.01); H04L 51/04 (2013.01)

(58) Field of Classification Search
None
See application file for complete search history.

(56) References Cited

U.S. PATENT DOCUMENTS

| | | | | |
|---|---|---|---|---|
| 7,096,459 B2* | 8/2006 | Keller | ................ | G06F 11/0709 714/E11.027 |
| 2006/0200373 A1* | 9/2006 | Garg | ...................... | A61B 5/00 709/224 |
| 2008/0201462 A1* | 8/2008 | Liss | ...................... | H04L 41/00 709/223 |
| 2011/0093457 A1* | 4/2011 | Kobayashi | ............ | G06Q 30/02 707/723 |
| 2014/0006768 A1* | 1/2014 | Carter | ...................... | G06F 8/33 713/100 |
| 2014/0129876 A1 | 5/2014 | Addepalli et al. | | |

(Continued)

FOREIGN PATENT DOCUMENTS

WO   2014088559 A1   6/2014

OTHER PUBLICATIONS

List of IBM Patents or Patent applications Treated as Related; Date Filed: Sep. 25, 2015, pp. 1-2.

(Continued)

*Primary Examiner* — Viet D Vu
*Assistant Examiner* — James A Edwards
(74) *Attorney, Agent, or Firm* — Cantor Colburn LLP; Alexander Jochym

(57) ABSTRACT

Aspects include methods, systems, and computer programs to identify changes in a plurality of resources in a collaborative effort system, comprising receiving, by the collaborative effort system, an input of a suspect resource, generating, by a processor, a list of identified resources based on the suspect resource, generating a list of changes of the identified resources, and displaying, by a user interface of the collaborative effort system, the list of the changes of the identified resources.

20 Claims, 4 Drawing Sheets

(56) References Cited

U.S. PATENT DOCUMENTS

| | | | |
|---|---|---|---|
| 2015/0006837 A1* | 1/2015 | Schmidt | G06F 11/1469 |
| | | | 711/162 |
| 2015/0065125 A1* | 3/2015 | Patel | H04W 8/12 |
| | | | 455/433 |
| 2016/0148148 A1* | 5/2016 | Kumar | G06Q 10/063116 |
| | | | 705/7.16 |

OTHER PUBLICATIONS

Mustansir Ali, et al.,"Tracking and Managing Items in a Collaborative Exchange", U.S. Appl. No. 14/865,129, filed Sep. 25, 2015.
Richard A. King, et al.,"Annotating Collaborative Content to Facilitate Mining Key Content As a Runbook," U.S. Appl. No. 114/865,111, filed Sep. 25, 2015.
Robert T. Uthe,"Enabling a Multi-Dimensional Collaborative Effort System", U.S. Appl. No. 14/865,148, filed Sep. 25, 2015.
King et al., "Annotating Collaborative Content to Facilitate Mining Key Content As a Runbook," US. Appl. No. 16/107,032, filed Aug. 21, 2018.
List of IBM Patents or Patent Applications Treated As Related; Date Filed: Aug. 28, 2018, 2 pages.

* cited by examiner

IDENTIFYING CHANGES IN MULTIPLE RESOURCES RELATED TO A PROBLEM

BACKGROUND

The present invention relates to problem solving, and more specifically, to methods and systems to identify changes in multiple resources related to a problem.

Within systems management, problems may arise that may require collaborative efforts to resolve. Collaborative efforts may include conference calls and/or online group discussions, such as virtual war rooms and group chats. The group chat may be a vital collaboration tool, yet group chat programs and application may not be built to handle intense and time sensitive discussions and/or a large scale discussion having multiple aspects to it, particularly for systems having a large number of resources. One solution to a large scale discussion is to create multiple virtual group chats at the same time to probe into different areas and/or resources. As multiple teams are divided up, there is more work or additional collaboration effort or tools that may be required to keep each of the separate groups connected and apprised of progress. One issue that may arise is that one group may not be able to easily and readily share information with another group as the other group may be part of a separate virtual war room. For example, one group may make changes related to a resource they are working with, but the group may not be able to easily notify all other groups of the change.

Historically a high percentage of problems (60-80%) that arise are due to failed changes within various resources. The change that causes a problem could be a change that went through a formal change process that ultimately caused the problem. Alternatively, the problem could arise from an out-of-process change where a user of one or more of the various resources of a system modified some configuration setting which resulted in the problem being formed.

As an example scenario, a problem may arise and a particular user may be asked if they made a change to a specific resource. The user may respond that they did not make any change. However, later in the process of solving the problem, the user may remember that they in fact made a change to the resource. The effect of a single user forgetting that a change was made to a particular resource may result in a severe impact on either the problem itself or on the length of time to resolve the problem.

One solution to this problem is to employ software that tracks changes made by users, which scan resources periodically to obtain a current configuration. The software can then compare the current configuration against one or more previous configurations to detect changes within the system (s). There are also different classes of products that are built to manage and understand particular types of resources, e.g., systems or devices. Such products may be configured to understand network devices and the associated detailed configuration and can detect changes thereto. All of these products have ways of querying for changes within the specific resource, with varying degrees of maturity and sophistication.

Problems may arise in an enterprise business application, which may be a very complex system that spans many different resources, e.g., domains, technical areas, physical systems, products, devices, operating systems, application, etc. It is normal to have components spanning multiple operating system(s) and/or distributed application component(s), middleware, software-as-a-service, on-premises software, network(s), physical/virtual servers, etc. In such situations and/or configurations, when a problem arises, multiple skilled persons may need to be gathered to understand the problem, track down symptoms, identify resources that could potentially be at fault, discover the real fault causing the problem, and then remedy it. This process can include upwards of 20-25 people and can take hours or days to resolve. For key business applications, this can cause significant financial loses. During this process, people may use tools specific to a resource to understand a change to that resource, and then the information must be collected to obtain a collective view of changes to all resources of the system. Such a process may be very time consuming. Further, due to the complexity of the systems, only certain or suspect areas may be consulted for changes, while other areas may not be inspected for changes, and thus certain resources may be omitted during a check for changes. As a result, multiple people may spend a significant amount of time trying to solve a problem.

Such situations may have direct bearing on the mean time to resolve a particular problem. Many problems are change-related and the lack of the knowledge that a user made a change may be a waste of time and/or resources, and prolong an outage to a business or operation. Thus, it may be advantageous to provide a system or application that can show a user all process or non-process changes that are related to any resource of interest uncovered through the problem-resolution process.

Some solutions require manual look-up of changes for each resource, and thus each resource must be reported on separately for all information and changes to be acquired for a check on changes within a complete system. Other solutions may be configured as self-contained systems wherein that every component of the system shares a common, normalized standard. That is, a single data model is implemented across all resources (e.g., systems, applications, operating systems, hardware, software, etc.) within the complete system. Such normalized/integrated systems are very difficult to implement, and may take years to evolve and be properly implemented in all aspects of the complete system.

SUMMARY

According to embodiments of the present invention, methods, systems, and computer program products are provided for identifying changes in a plurality of resources in a collaborative effort system, comprising receiving, by the collaborative effort system, an input of a suspect resource, generating, by a processor, a list of identified resources based on the suspect resource, generating a list of changes of the identified resources, and displaying, by a user interface of the collaborative effort system, the list of the changes of the identified resources.

DETAILED DESCRIPTION

Figure 1:
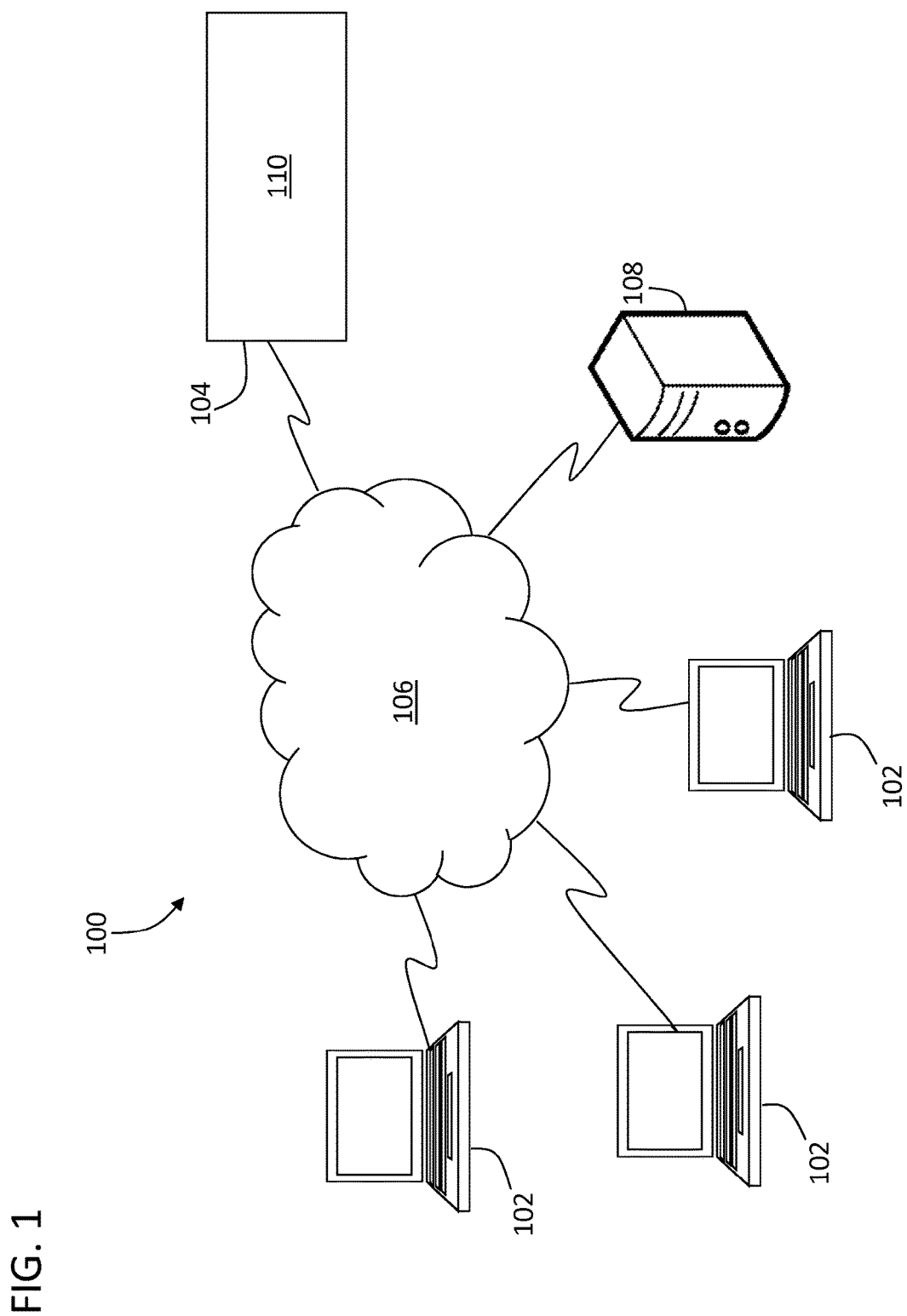
FIG. 1 depicts a block diagram of a system for enabling collaborative efforts to generate collaborative content in accordance with an embodiment.

Various embodiments described herein provide systems and processes for generating and managing multiple chat features within a collaborative effort or system, such as a war room, chat room, dialogue program, social network, etc. Further, various embodiments described herein provide enabling multiple chat threads within a single collaborative effort system. Moreover, various embodiments described herein enable selectively enabling specific users or groups of users to one or more of a multiple of threads within a collaborative discussion system.

As problems arise in various systems, depending on the seriousness and/or complexity of the problem, the problem may be routed to one or more subject matter experts (SME). As applications and systems have increased in complexity, multiple SMEs may work collectively and collaboratively to figure out where a given problem lies and how to fix it. That is, multiple SMEs (or other persons) may perform a collaborative effort to define a problem, identify where the problem exists, and find a resolution to the problem. In high pressure problems it may not be uncommon to have upward of twenty-five or more people collaborating to solve a single problem. Further, in certain situations, various groups of SMEs that may specialize in particular areas or resources may be grouped to address sub-issues, sub-problems, or various specific aspects of a larger problem that has been identified. The problem may be within a system that is formed of a plurality of resources. Resources, as used herein, may include operating systems, distributed application components, middleware, software-as-a-service, on-premises software, networks, physical/virtual servers, applications, software, hardware, devices, domains, components, etc.

One option to enable a collaborative effort is the use of group chat and/or networking, which may be the basis for group collaboration in a "virtual war room" capability. As used herein, the term "collaborative effort system" will be used to refer to a group chat, virtual war room, instant messaging, short message services, blog, website, online community, news feed, email, wiki, etc., or other social or collaborative application, process, and/or system. The collaborative effort system may contain the dialog of interactions back and forth between several SMEs and other persons as they chase leads and ultimately uncover key symptoms of the problem. The collaborative effort system may also include the discussion that the SMEs and other persons have when they find or identify the problem and the actions they took in response to the problem, whether the actions were successful or not. Further, the collaborative effort system may include a list of resource(s) that, at a given moment, are the ones deemed most likely to have caused the problem. That is, the collaborative effort system will thus contain all of the information uncovered through the problem-resolution cycle that is performed by the SMEs within the collaborative effort system, including resources that were under consideration and ultimately cleared of wrongdoing, and the resource that ultimately was the cause of the problem. This information may include hundreds or thousands of messages and/or changes spanning not only the ultimate resolution to the problem, but may include all of the details about the paths, options, resources, and changes investigated and subsequently cleared of being a cause of the problem and/or potential solutions that were not completed or sufficient to solve the problem adequately.

Certain complex problems may require SMEs and other persons from various technical backgrounds to discuss a feature or aspect of the problem and resolve an issue or problem within the specific technical area. For example, resource-specific SMEs may be involved in solving a particular problem. As such, multiple, different groups of people may be working on different aspects, areas, or resources related to the problem. Embodiments described herein enable a single collaborative effort system that incorporates change tracking of all identified resources that may be related to a problem, and thus enables synchronization of work between the various groups and discussions, and identification of all changes made prior to a problem arising and any changes made during resolution of the problem.

As described herein, embodiments disclosed may be employed for any problem diagnostic scenario. If a user identifies a specific resource that a problem is related to, tracking of changes related to all associated resources may be monitored. If the problem is documented as an incident or ticket, the problem resource may be captured as an impacted configuration item. If the problem is documented as an event, rather than being resource-specific, certain specific resources may be captured as nodes.

Referring to FIG. 1, a block diagram of a system 100 for enabling a collaborative effort system and tracking changes of resources pertaining to a discussion in accordance with an embodiment is shown. The system 100 includes a chat or discussion application, hereinafter collaborative effort system 110, for performing the processing described herein that is executed by one or more computer programs located on a host system 104 and/or a user system(s) 102. The collaborative effort system 110 may include an asset management application to perform tracking of changes in resources.

The system 100 depicted in FIG. 1 includes one or more user systems 102 through which users, e.g., SMEs and other persons, at one or more geographic locations may contact the host system 104 to initiate programs and/or participate in the collaborative effort system 110. The user systems 102 are coupled to the host system 104 via a network 106. Each user system 102 may be implemented using a general-purpose computer executing a computer program for carrying out the processes described herein. The user systems 102 may be user devices such as personal computers (e.g., a laptop, a tablet computer, a cellular telephone, etc.) or host attached terminals. If the user systems 102 are personal computers, in some embodiments, the processing described herein may be shared by a user system 102 and the host system 104. The user systems 102 may also include game consoles, network management devices, and field programmable gate arrays. In addition, multiple user systems 102 and/or host systems 104 may be concurrently operating to aggregate web interactions for personalized usage.

The network 106 may be any type of known network including, but not limited to, a wide area network (WAN), a local area network (LAN), a global network (e.g. Internet), a virtual private network (VPN), a cloud network, and an intranet. The network 106 may be implemented using a wireless network or any kind of physical network implementation known in the art. A user system 102 may be coupled to the host system through multiple networks 106 (e.g., cellular and Internet) so that not all user systems 102 are coupled to the host system 104 through the same network 106. One or more of the user systems 102 and the host system 104 may be connected to the network 106 in a wireless fashion. In one non-limiting embodiment, the network is the Internet and one or more user systems 102 execute a user interface application (e.g. a web browser) to contact the host system 104 through the network 106. In another non-limiting example embodiment, the user system 102 is connected directly (i.e., not through the network 106)

to the host system 104. In a further non-limiting embodiment, the host system 104 is connected directly to or contains a storage device 108. The network 106 may be employed by the collaborative effort system 110 such that the collaborative effort system 110 may communicate with one or more resources, either directly or indirectly.

The storage device 108 includes data relating to the collaborative effort system 110 and/or data relating to a problem to be solved, including lists of resources and associated resources. In some embodiments, the storage device 108 may be implemented using a variety of devices for storing electronic information. In an example embodiment, data stored in the storage device 108 includes, but is not limited to, one or more search data and search history databases, and other data utilized by embodiments described herein. It is understood that the storage device 108 may be implemented using memory contained in the host system 104 or that it may be a separate physical device. The storage device 108 may be logically addressable as a consolidated data source across a distributed environment that includes the network 106. Information stored in the storage device 108 may be retrieved and manipulated via the host system 104 and/or via a user system 102.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access, e.g., permitting only designated SMEs and/or other authorized persons to access the collaborative effort system 110. For instance, an administrator may have access to the entire system and have authority to modify portions of the system and/or permissions thereto. A firewall may be implemented using conventional hardware and/or software as is known in the art.

The host system 104 may also operate as an application server. The host system 104, in such embodiments, may execute one or more computer programs, including the collaborative effort system 110, to provide aspects of embodiments as described herein. Processing may be shared by the user system 102 and the host system 104 by providing an application to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

During a collaborative effort, one or more users, e.g., SMEs and other persons, may use a user system 102 to communicate through the network 106 and participate in a discussion on the host system 104 employing the collaborative effort system 110. In some embodiments, users or groups of users may be divided into different groups and/or threads that are carried out in parallel. Further, during a collaborative effort, one or more users may instruct the collaborative effort system 110 and/or the host system 104 to communicate with one or more resources over the network 106.

Figure 2:
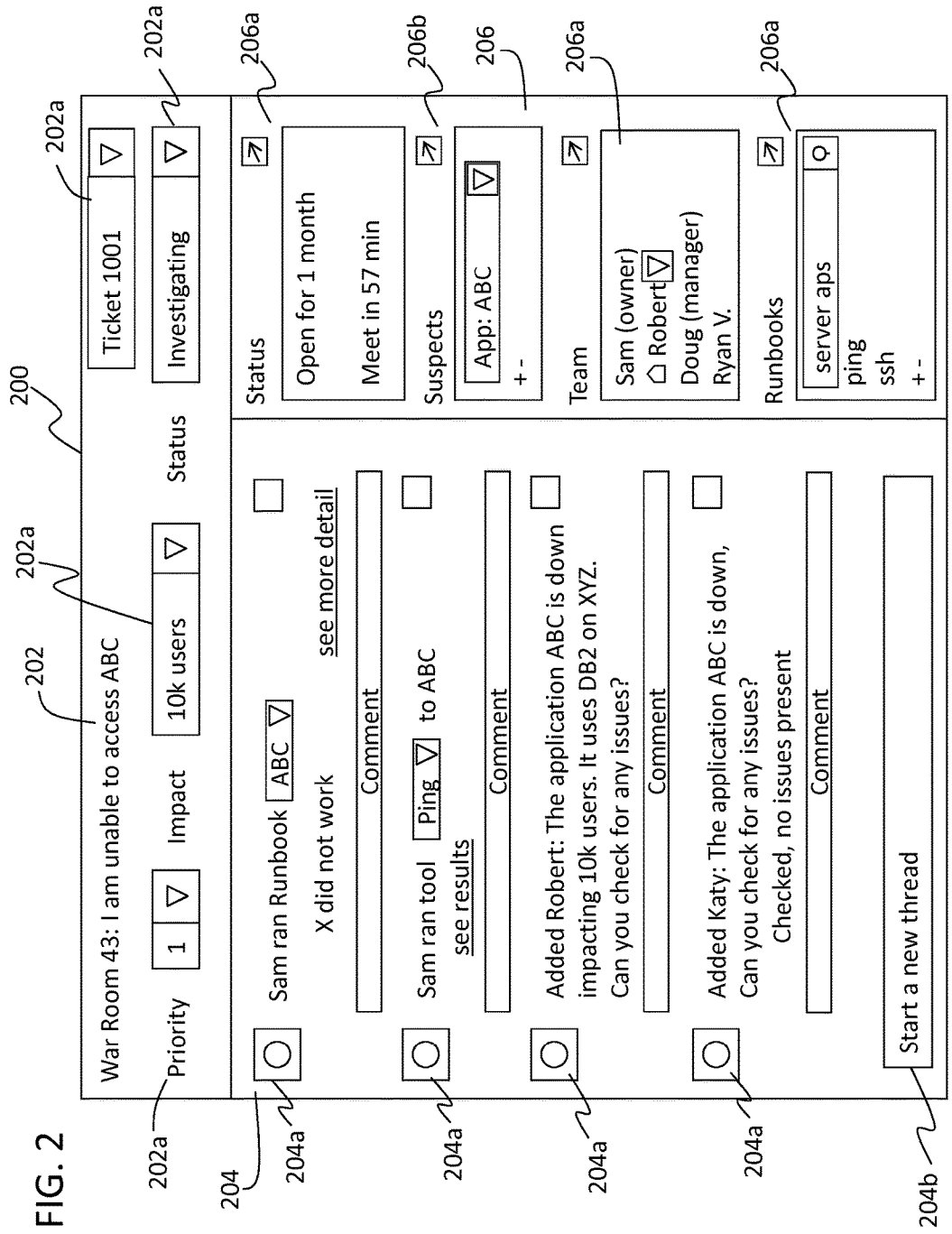
FIG. 2 depicts an illustrative view of a user interface of a collaborative application incorporating features in accordance with an embodiment.

Turning to FIG. 2, an example of problem diagnostics within a collaborative effort system in accordance with an example embodiment of the present disclosure is shown. In this example a group of experts are collaborating intensely to solve a major problem, and in their investigations any user of the collaborative effort system may identify a specific resource as a "suspect resource." This is a manual way of identifying one or more resources that the problem pertains to. A suspect resource may be a resource that is identified or indicated as a potential source of the problem, and thus may require further investigation and/or monitoring for changes.

User interface 200 may be a visual representation of the collaborative effort system 110 presented on a user device 102 as executed by a host system 104 as shown in FIG. 1. User interface 200 may include one or more windows configured to provide functionality and/or information therein. For example, a first window 202 may provide general information about the particular collaborative effort system, a second window 204 may provide information and contain content regarding the process to reach a solution to the problem, and a third window 206 may provide additional information and/or options within the user interface 200. Each of these example potential windows of a non-limiting embodiment will now be described.

The first window 202 may provide general information about the particular collaborative effort system. As shown, first window 202 includes a war room number ("war room 43") and a description of the general problem to be solved within war room 43: "I am unable to access ABC." ABC may be a resource, such as a program, application, server, website, and/or other virtual or physical element that may be subject to one or more problems. Also included in the first window 202 may be one or more modifiable fields 202a that provide additional general information related to the problem and/or resource, including, but not limited to priority, status, impact, etc. As shown, FIG. 2 indicates a matter number "ticket 1001." Additionally, a priority field is present, and as shown is indicated as "Priority 1." Impact information may also be provided, indicating the impact of the identified problem, and here is shown as 10,000 users are impacted. Finally, as shown, the first window 202 may include a status field that indicates the status of the progress on the problem, and is shown as "investigating." Those of skill in the art will appreciate that the first window 202 may include other fields, information, etc. and/or combinations thereof.

The second window 204 may provide information and contain content regarding the process to reach a solution to the problem. That is, the second window 204 may be a log of the process including the content of the collaborative effort submitted by users of the collaborative effort system. The content may be represented by one or more log elements 204a that are located within the second window 204. The log elements 204a may be threads, comments, entries provided by users, pictures, URL links, etc., hereinafter "content." For example, each log element 204a may be a thread that addresses one sub-problem, a comment directed to a specific user, thoughts and conversations, etc., or combinations thereof. Alternatively, or in combination, log elements 204a may be each entry within the collaborative effort system within the second window 204. Each log element 204a may be an entry in the collaborative effort system in interface 200 that has already been submitted. The log elements 204a thus form the user-content of the collaborative effort system.

New log elements 204a may be created by a user interacting with an entry element 204b. Entry element 204b may be configured to allow users to type information into the second window 204, such as provide a comment or to add a new thread and comments therein. The entry element 204b is how a user may generate a new log element 204a, thus expanding the user-content within the collaborative effort system.

The third window 206 may provide additional information and/or options within the user interface 200. For example, as shown, the third window 206 may include supporting elements 206a. One supporting element 206a may be a status element that indicates the duration of the problem, e.g., when the problem was identified, and may also include milestone or event timers such as indicators when meetings or calls may be required of the users of the collaborative effort system. Supporting elements 206a may also include links or other methods of retrieving and/or accessing resources, information, programs, etc. that are outside of the interface 200 and/or outside of the collaborative effort system (e.g., through network 106 shown in FIG. 1). For example, a supporting element 206a may provide direct access for a user to access operational or ownership details of a resource shown here as "App: ABC." Supporting elements 206a may also include a listing of the users, e.g., the SMEs and other persons involved with the project/problem, and further may enable direct contact between one or more specific users. For example, a supporting element 206a may enable a direct messaging service to users of the collaborative effort system. Other user-specific information may be provided within the supporting elements 206a, such as user position, user access, company affiliation, etc. Further, links to additional resources, such as runbooks or other pre-existing material, that are associated with the problem and/or associated with systems, elements, etc. associated with the program or other systems that includes the problem may be provided in supporting elements 206a.

Although a single configuration of a user interface 200 of a collaborative effort system is shown herein, those of skill in the art will appreciate that the user interface 200 may take any number of formats and/or configurations. For example, in some embodiments, the user interface 200 may comprise a single window with multiple aspects thereto and/or all of the above describe capabilities may be configured within a single window or application user interface. In other embodiments, each window may be a separate feature of the collaborative effort system. Thus, the illustration of FIG. 2 is not intended to be limiting but rather is provided for illustrative and discussion purposes.

Figure 3:
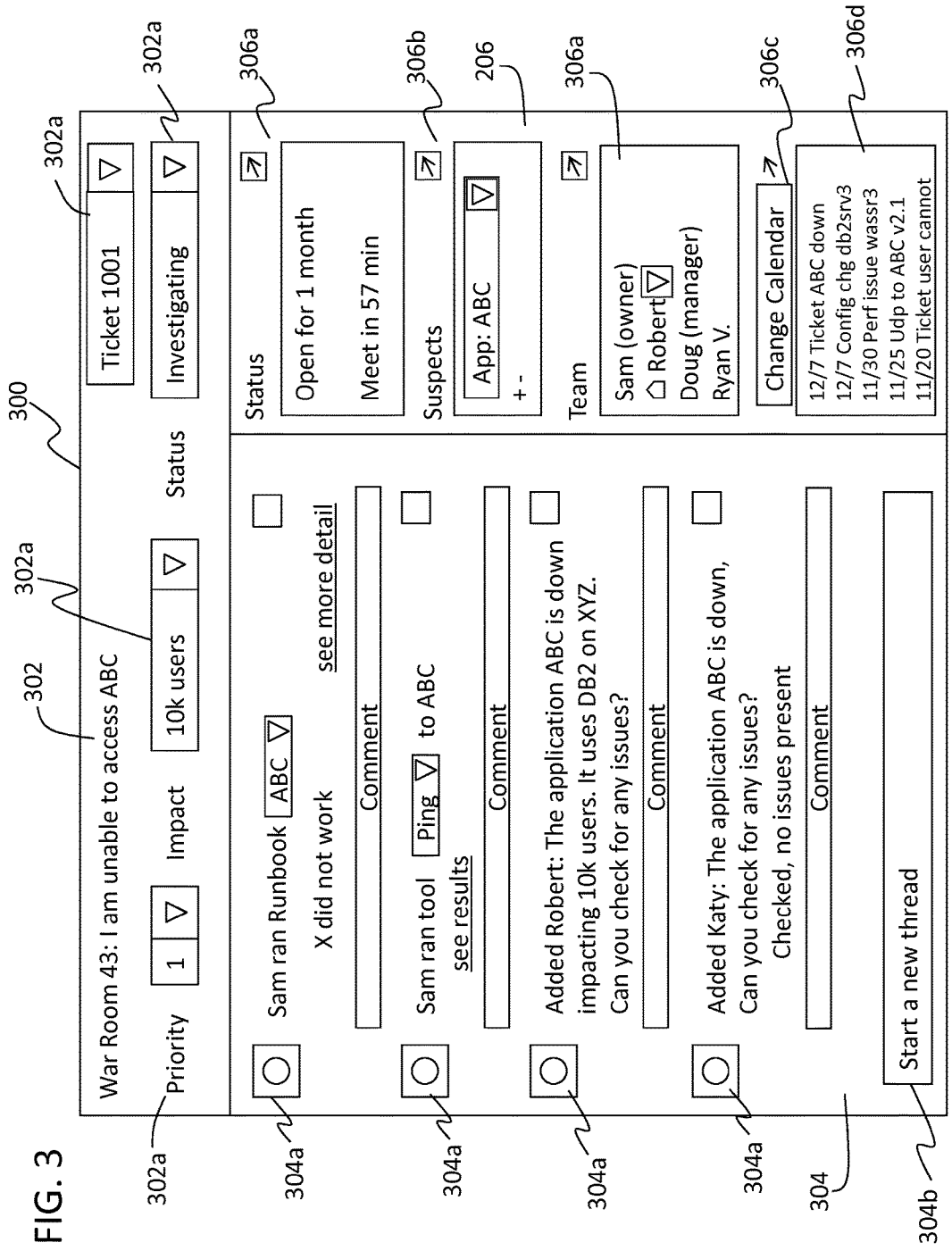
FIG. 3 depicts an illustrative view of a user interface of a collaborative application incorporating features in accordance with an embodiment.

Turning now to FIG. 3, an alternative view of a collaborative effort system is shown. The collaborative effort system of FIG. 3 may be substantially similar to that shown and described with respect to FIG. 2, and thus the similar features will not be explained again for simplicity. Thus, a user interface 300 of a collaborative effort system includes a first window 302 having a plurality of fields 302a, as described above. Further, a second window 304 may include a plurality of log elements 304a and an entry element 304b. Finally, a third window 306 may include multiple supporting elements 306a.

In the third window 306, the supporting elements 306a may include a suspect resource list 306b. The suspect resource list 306b may be a list of resources of interest that are potentially related to the problem being addressed. Thus, the suspect list 206b may include all resources that may have caused the problem or may be related to the problem, and may be displayed such that all users of the user interface 300 can view and see all of the potential suspect resources. The suspect resource list 306b may be modified by a user or may be modified by the collaborative effort system. For example, a database server or network router could be added as a suspect if investigations show the components as potentially at fault for the problem. After further investigation, a resource could be removed from the suspect list after being observed as running normally. As shown in FIG. 3, the suspect resource list 306b includes "App: ABC" which identifies the application known as "ABC" as the primary resource that has an issue, i.e., a first resource.

In addition to the suspect resource list 306b there may be a change calendar 306c. The change calendar 306c may be a list, calendar view, link, or other display or link to a display of all changes related to resources on the suspect resource list 306b. For example, the change calendar 306c may display in the user interface 300 all changes that have occurred to the resources of the suspect resource list 306b. The change calendar 306c may be an active ticker which may update in real time as changes occur to the resources of the suspect resource list 306c, or it may update iteratively as it searches for and finds changes in various change systems. In other non-limiting embodiments or in combination therewith, the changes listed in the change calendar 306c may be indicated changes from a specific or predefined time. For example, if a problem occurs on a specific date, the change calendar 306c may display all changes that occurred on or about the specific date.

Thus, by viewing the change calendar 306c, a user can view and identify what changes have been made to one or more resources, and when those changes were made. As shown in the example illustration of FIG. 3, a list of change entries 306d are shown. This is merely for example, as each resources and/or problem will have related changes associated and specific thereto. In alternative, non-limiting embodiments, the information may be visualized in a more sophisticated Gantt chart style of user interface which plots changes on a calendar while also showing inter-dependencies. Those of skill in the art will appreciate that the change calendar 306c may be presented in any of a variety of display views.

To populate the suspect resource list 306b and/or the change calendar 306c, embodiments described herein employ a two-phased approach to finding a set of changes related to one or more resources identified as a potential problem, and thus assist in identifying a change that may have caused the problem. As described herein, the processes performed herein may be performed by one or more of the components described and shown in FIG. 1. For example, an asset management application may be part of a collaborative effort system and may be run on a user systems and/or a host system.

The first phase is to identify a suspect resource and any related resources that the suspect resource is dependent upon or communicates with in some capacity. The query may be directed at any available management system that processes information about resources and inter-relationships thereof. For example, an asset management system may contain information on resources, physical locations, and high level relationships to indicate a data center the resource may be in. An application management system may use transaction paths to understand, for a given application/system, the specific resources it is comprised of (e.g., application software, middleware, web servers, database servers, etc.). An inventory system may scan the given application/system to periodically gather an inventory of the application/system's hardware and software, and "crawl" the network looking for new resources and examine common TCP/IP port usage to deduce what other resources the specific application/system is actively communicating with. That is, the collaborative effort system may query any identified management systems to determine if other resources are related to any of the original resources listed in list 306d. The related resources are important to identify and track because any problems with and/or changes made to the related resources may propagate over and impact other resources that they interact with. As will be appreciated by those of skill in the art, in some embodiments, when identifying a given resources, the given resource may be identifiable using known methods and practices. For example, a set of common naming attributes such as hostname, IP address, GGUID, Mac Address, System Serial Number, etc. may be used when identifying given resources.

Upon calculating the expanded resources list (i.e., the suspect resource and any found related resources) the collaborative effort system may generate, populate, or update the suspect resource list 306b. For example, in operation, a user may identify a first resource as a potential suspect resource to which the collaborative effort system will solicit for related resources. The related resources may then be added to a list of second resources. The list of second resources may then be added to the suspect resource list 306b. Accordingly, all resources that are associated with the suspect resource may be identified as being a possible origination of the problem. Associated resources may be resources that are connected to the suspect resource and/or may be resources that are related to information, data, or connections of the suspect resource. From the above response to the query, the suspect resource, the sub-resources of the suspect resource and all related or associated resources are known and may be used to populate the suspect resource list 306b. As used herein, the resources listed in the suspect resource list 306 will be referred to as "identified resources." In some embodiments, the collaborative effort system may be configured to repeat the process and query for related resources to those in the second list to produce a third list. That is, in this configuration, a first list may be one or more identified resources, the second list may be a list of resources that are related to the identified resources, and the third list may be a list of resources that are related to the related resources (i.e., the resources on the second list).

In the second phase of the collaborative effort system querying, a query may be sent to each of the identified management systems to query for changes. For example, a problem and incident system would reply with official changes and work orders against any of the identified and/or listed resources. An inventory or discovery system would reply with observed changes in any of the resources. An operational management system would reply with a list of operational events received about any of the resources. A network management system would reply with details about network configuration changes about any of the resources. The query may have a time restriction, or may be a request for an instantaneous incremental change. Further, in some embodiments, the collaborative effort system may be configured to create and track all the changes itself, such that the collaborative effort system queries for a status of each identified resource, and then will determine any changes when a subsequent query is made to each of the identified resources. In this manner a list of changes may be obtained.

In some embodiments, the process of querying from the collaborative effort system may need to be integrated into the resource such that when a query is received from the collaborative effort system the resource may appropriately respond. For example, an enablement process or update in each resource could be delivered in a release to the resource.

In other embodiments, a wrapper could be built that queries a resources' existing application program interface for all queries "from the outside." Thus, implementation of the collaborative effort system as used herein may be able to be employed on a variety of different resources, e.g., systems, domains, etc. without requiring normalization between all of the resources.

As noted, the identified resources may populate the suspect list 306b. Further, the change calendar 306d may list all changes that are received during the query. Accordingly, users of the collaborative effort system may be able to determine what suspect resources may be at issue and what and when recent changes to those resources may have occurred.

Advantageously, embodiments described herein may provide a means to deliver asset management and change capability quickly. As will be appreciated by those of skill in the art and noted above, the resultant change list, e.g., the change calendar 306c, can be presented to a user in many ways. As depicted in FIG. 3, the suspect list 306b and/or the change calendar 306c are displayed as tables.

Figure 4:
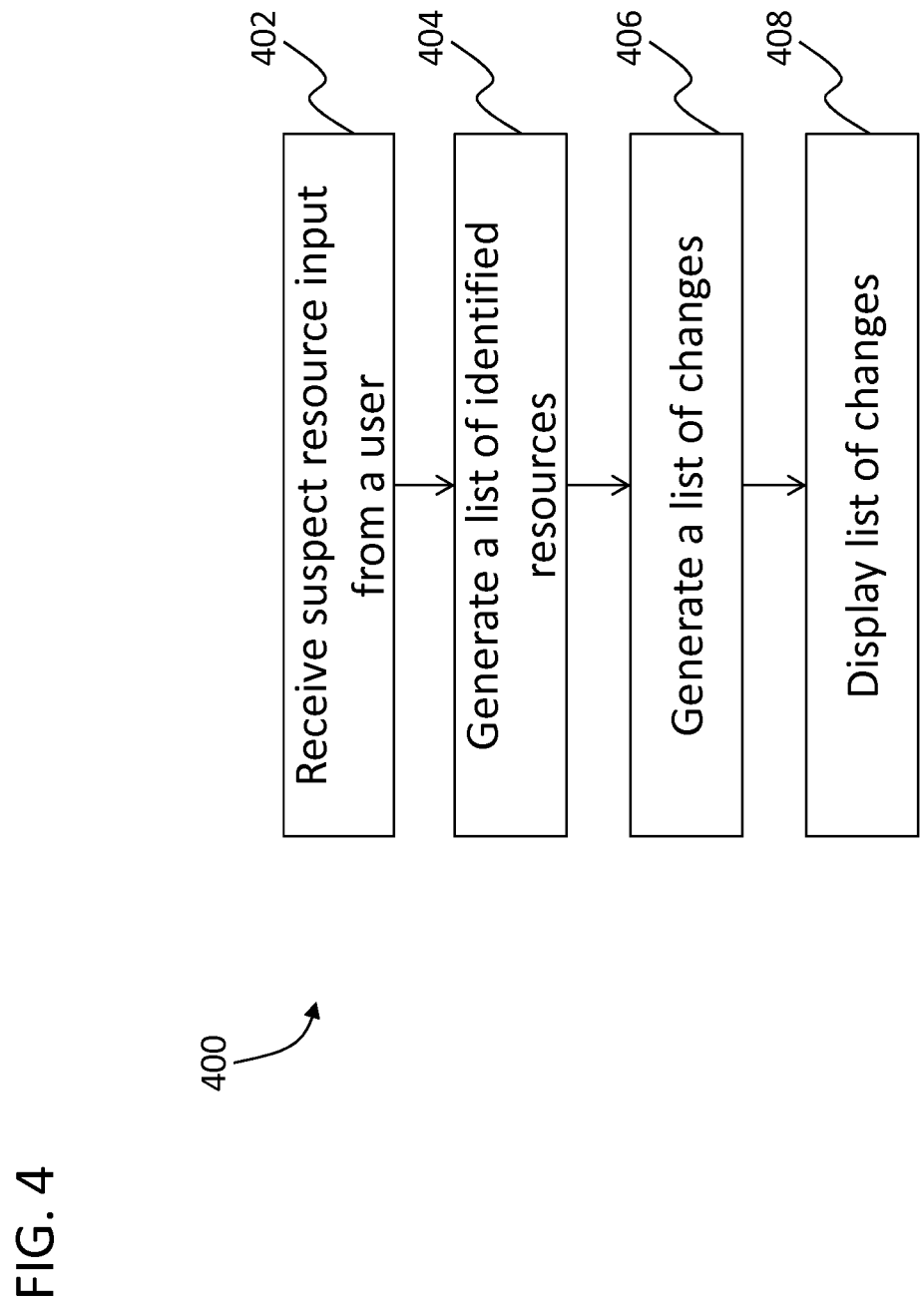
FIG. 4 depicts a flow process for identifying resources and changes thereof in accordance with an embodiment.

Turning now to FIG. 4, a process flow for managing and monitoring changes in resources as part of a collaborative effort system in accordance with an embodiment is shown. Process flow 400 may be similar to that described above, and may be implemented on a host system and/or a user system, such as in system 100 of FIG. 1. Process flow 400 may represent the operation of a collaborative effort system that is used by one or more users.

To track changes, a collaborative effort system may receive input identifying a suspect resource at block 402. The input may be received from one or more users that are accessing and/or interacting with the collaborative effort system. Alternatively, or in combination, the input may be received automatically. That is, for example, a user may identify a first resource, and a resource list may be populated. From the resource list, a second list may be generated automatically which includes all associated resources that are related to the first resource. Thus, at block 402, the input may be received automatically from a list of suspect resources in combination with or alternatively from a user input.

Next, a list of identified resources may be generated at block 404. The list of identified resources may be a full or complete list of all resources and sub-resources that are part of and/or associated with the suspect resource.

For example, at block 402, a suspect resource, e.g., "App ABC," may be input into the collaborative effort system. When this input is received, App ABC may be configured to supply a list of sub-resources and/or associated resources—or supply the list in response to a query from the collaborative effort system. The complete list may be a list of the identified resources as defined above, with App ABC and all related and/or associated resources provided. As noted, in some embodiments, block 404 may include the collaborative effort system sending a query to available management systems to retrieve related resources that they are aware of. In this example, when App ABC is input into the collaborative effort system, the collaborative effort system will query an application management system to receive a list of sub-resources and/or associated resources that collaborate and collectively provide the function of the ABC application. These resources will be used to generate a list of identified resources.

Next, at block 406, a list of changes may be generated. The list of changes may be all changes that have occurred to each resource from the list of identified resources. The list of changes may be displayed in a user interface, at block 408, such that one or more users may view the list and determine if a particular change to a particular resource may be related to or caused the problem. The list of changes may be determined by the collaborative effort system and/or may be supplied from each identified resource.

As will be appreciated by those of skill in the art, the resources associated or related to a suspect resource may be exponentially large. Thus, in some embodiments, a limit or extent of relation to the originating suspect resource may be imposed. For example, a particular suspect resource, hereinafter "first resource," may be directly connected to three second resources, and each of these resources may each be connected with two third resources, resulting in a total of ten resources in this example. Monitoring the changes of ten resources, or more, may be cumbersome and have diminishing returns. For example, the less a resource is related to a suspect resource directly, the less likely it may have any impact on the problem, and thus tracking changes with a remote resource may not be efficient.

Accordingly, when seeking out related or associated resources, it may be advantageous to provide controls that constrain how many "hops" to traverse, i.e., the extent of the relation to be identified and included. In the above example, a single hop would be the second resources. That is, with a query, only those resources that are directly connected to the first resource may be identified. Thus, in some embodiments, the default may be configured as a single hop. A second hop would include or capture all of the third resources. Thus, for additional hops the process just repeats the first phase described with the expanded set of resources from the previous hop. That is, in some examples, the second hop may be a repeat of process flow 400 for each resource in the particular hop. Accordingly, the suspect resource list and/or the list of changes may grow as the process is performed.

Further, in accordance with a non-limiting embodiment, changes that are presented in the change list could be weighted based on how far away the resource and/or the change are from the original suspect resource. In this manner a change directly to the first resource may be presented as the highest priority on the change list, with changes against the next most immediate related components (second resources) are the next highest, and so on. In such configurations, changes on something ten or more hops away could still be returned, but emphasized much lower because it is less likely to be the cause of the problem.

Additionally, a third phase may be implemented beyond identifying the suspect resource (and associated resources) and obtaining/displaying the changes. The third phase may be a configuration wherein the collaborative effort system queries for operational health across the set of identified resources. In this manner, connected resources may return a list or status of which resources/sub-resources are running normally versus resources/sub-resources that may be degraded in some fashion versus resources/sub-resources being down or non-operational.

Technical effects and benefits include a collaborative effort system that is configured to obtain changes in resources related to a problem and displaying them for all users of the collaborative effort system. Further technical effects and benefits include identifying associated or related resources such that a complete list of all potential sources of a problem may be identified, and tracking the changes in each of these resources.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to identify changes in a plurality of resources by a collaborative effort system, the method comprising:
   receiving, by the collaborative effort system, an input of a suspect resource of a first system, wherein the collaborative effort system comprises a plurality of user systems connected by a network;
   generating, by a processor, a list of identified resources based on the suspect resource;
   generating a list of changes that includes all changes that have been made to all of the identified resources during a time period, wherein the time period includes a date on which a problem with the suspect resource occurred;
   displaying, by a user interface of the collaborative effort system, the list of the changes of the identified resources, wherein the list of the changes is displayed in a calendar view that includes an indication of when, during the time period, that each of the changes were made;
   updating the list of changes displayed in real-time as changes are made to each of the identified resources; and
   updating the list of identified resources to indicate each resource that is not causing a problem in the first system based on input from one or more users of the collaborative effort system.

2. The computer implemented method of claim 1, wherein the input is received from a user utilizing the user interface of the collaborative effort system.

3. The computer implemented method of claim 1, wherein generating the list of identified resources comprises the collaborative effort system querying one or more management systems that contain resource information.

4. The computer implemented method of claim 1, wherein generating the list of changes comprises the collaborative effort system querying one or more management systems that contain change information.

5. The computer implemented method of claim 1, wherein the identified resources comprises a list of resources that are associated with the suspect resource.

6. The computer implemented method of claim 5, wherein the association is based on a number of hops from the suspect resource.

7. The computer implemented method of claim 6, wherein the identified resources comprises a list of resources that are within one hop of the suspect resource.

8. The computer implemented method of claim 1, further comprising:
   weighting at least one of the identified resources or the list of changes; and displaying, by the user interface of the collaborative effort system, a weighted list based on the weighting.

9. The computer implemented method of claim 1, further comprising:
querying the identified resources for operational health; and
displaying, by the user interface of the collaborative effort system, the operational health of the identified resources.

10. A system to identify changes in a plurality of resources by a collaborative effort system comprising:
a memory having computer readable instructions; and
a processor configured to execute the computer readable instructions, the computer readable instructions comprising:
receiving, by the processor, an input of a suspect resource of a first system;
generating, by the processor, a list of identified resources based on the suspect resource;
generating a list of changes that includes all changes that have been made to all of the identified resources during a time period, wherein the time period includes a date on which a problem with the suspect resource occurred;
displaying, by a user interface of the collaborative effort system, a list of the changes of the identified resources, wherein the collaborative effort system comprises a plurality of user systems connected by a network, and wherein the list of the changes is displayed in a calendar view that includes an indication of when, during the time period, that each of the changes were made;
updating the list of changes displayed in real-time as changes are made to each of the identified resources; and
updating the list of identified resources to indicate each resource that is not causing a problem in the first system based on input from one or more users of the collaborative effort system.

11. The system of claim 10, wherein the input is received from a user utilizing the user interface of the collaborative effort system.

12. The system of claim 10, wherein generating the list of identified resources comprises the collaborative effort system querying one or more management systems that contain resource information.

13. The system of claim 10, wherein generating the list of changes comprises the collaborative effort system querying one or more management systems that contain change information.

14. The system of claim 10, wherein the identified resources comprise a list of resources that are associated with the suspect resource.

15. The system of claim 10, wherein the computer readable instructions further comprise:
weighting at least one of the identified resources or the list of changes; and
displaying, by the user interface of the collaborative effort system, a weighted list based on the weighting.

16. The system of claim 10, wherein the computer readable instructions further comprise:
querying the identified resources for operational health; and
displaying, by the user interface of the collaborative effort system, the operational health of the identified resources.

17. A computer program product to identify changes in a plurality of resources by a collaborative effort system, the computer program product comprising a computer readable storage medium having program instructions embodied therewith, the program instructions executable by a processor to cause the processor to:
receive, by the collaborative effort system, an input of a suspect resource of a first system;
generate a list of identified resources based on the suspect resource;
generate a list of changes that includes all changes that have been made to all of the identified resources during a time period, wherein the time period includes a date on which a problem with the suspect resource occurred;
display, by a user interface of the collaborative effort system, a list of the changes of the identified resources, wherein the collaborative effort system comprises a plurality of user systems connected by a network, and wherein the list of the changes is displayed in a calendar view that includes an indication of when, during the time period, that each of the changes were made;
update the list of changes displayed in real-time as changes are made to each of the identified resources; and
updating the list of identified resources to indicate each resource that is not causing a problem in the first system based on input from one or more users of the collaborative effort system.

18. The computer program product of claim 17, wherein the input is received from a user utilizing the user interface of the collaborative effort system.

19. The computer program product of claim 17, wherein generating the list of identified resources comprises the collaborative effort system querying one or more management systems that contain resource information.

20. The computer program product of claim 17, wherein the identified resources comprises a list of resources that are associated with the suspect resource.

* * * * *